United States Patent
Yokote

(10) Patent No.: US 11,592,773 B2
(45) Date of Patent: Feb. 28, 2023

(54) IMAGE FORMING APPARATUS THAT CORRECTS DENSITY UNEVENESS IN A MAIN SCANNING DIRECTION

(71) Applicant: CANON KABUSHIKI KAISHA, Tokyo (JP)

(72) Inventor: Akihito Yokote, Noda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/988,194

(22) Filed: Aug. 7, 2020

(65) Prior Publication Data
US 2021/0041822 A1 Feb. 11, 2021

(30) Foreign Application Priority Data
Aug. 8, 2019 (JP) .............................. JP2019-146646

(51) Int. Cl.
*G03G 15/00* (2006.01)
*G03G 15/043* (2006.01)

(52) U.S. Cl.
CPC ....... *G03G 15/5062* (2013.01); *G03G 15/043* (2013.01); *G03G 2215/00042* (2013.01); *G03G 2215/00067* (2013.01); *G03G 2215/00569* (2013.01); *G03G 2215/00755* (2013.01)

(58) Field of Classification Search
CPC ..... G03G 15/5062; G03G 2215/00067; G03G 15/5087; G03G 15/55; G03G 15/5041; G03G 15/556; G03G 15/5058; G03G 15/043; G03G 2215/00569; G03G 2215/00037; G03G 2215/00063; G03G 2215/00042; G03G 2215/00755; H04N 1/00

See application file for complete search history.

(56) References Cited

U.S. PATENT DOCUMENTS

| 2003/0049039 A1* | 3/2003 | Suzuki ............... G03G 15/5058 399/49 |
| 2011/0222868 A1* | 9/2011 | Sakatani ............ G03G 15/5062 399/15 |

(Continued)

FOREIGN PATENT DOCUMENTS

| JP | 2007-264364 A | 10/2007 |
| JP | 2009-192896 A | 8/2009 |

*Primary Examiner* — Arlene Heredia
*Assistant Examiner* — Laura Roth
(74) *Attorney, Agent, or Firm* — Venable LLP

(57) ABSTRACT

An image forming apparatus includes a converter configured to convert image data with use of a tone correction condition corresponding to a position in a main scanning direction of the image data, and an image forming unit, which includes a photosensitive member and an exposure portion configured to expose the photosensitive member to light based on the converted image data, and is configured to form an image on a recording medium. The image forming apparatus further includes a holding portion configured to hold a plurality of feedback conditions corresponding to a plurality of tones and a controller configured to control the image forming unit to form a plurality of test images, acquire measurement results for the plurality of test images, and generate the tone correction condition based on the measurement results and the plurality of feedback conditions.

9 Claims, 14 Drawing Sheets

(56) References Cited

U.S. PATENT DOCUMENTS

2013/0094875 A1* 4/2013 Ogata ................ G03G 15/0189
399/74
2017/0293237 A1* 10/2017 Yago .................. G03G 15/5058
2019/0163108 A1* 5/2019 Sakurada ........... G03G 15/5041

* cited by examiner

| DENSITY DIFFERENCE | | | | | | | | | | | | | | | | | | | | | | | | | | | |
|---|---|---|---|---|---|---|---|---|---|---|---|---|---|---|---|---|---|---|---|---|---|---|---|---|---|---|---|
| | | POSITION IN MAIN SCANNING DIRECTION | | | | | | | | | | | | | | | | | | | | | | | | | AVERAGE DENSITY |
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | |
| TONE | 63 | 0.12 | 0.13 | 0.13 | 0.13 | 0.12 | 0.12 | 0.12 | 0.12 | 0.12 | 0.12 | 0.12 | 0.12 | 0.11 | 0.12 | 0.12 | 0.12 | 0.11 | 0.11 | 0.11 | 0.10 | 0.10 | 0.09 | 0.09 | 0.09 | 0.09 | 0.11 |
| | 255 | 0.26 | 0.27 | 0.28 | 0.28 | 0.27 | 0.27 | 0.27 | 0.27 | 0.27 | 0.27 | 0.26 | 0.27 | 0.26 | 0.26 | 0.26 | 0.26 | 0.25 | 0.25 | 0.25 | 0.25 | 0.24 | 0.24 | 0.24 | 0.23 | 0.23 | 0.26 |
| | 447 | 0.49 | 0.49 | 0.49 | 0.47 | 0.47 | 0.46 | 0.45 | 0.46 | 0.46 | 0.45 | 0.45 | 0.44 | 0.45 | 0.45 | 0.45 | 0.45 | 0.44 | 0.44 | 0.44 | 0.43 | 0.44 | 0.42 | 0.44 | 0.42 | 0.42 | 0.45 |
| | 639 | 0.76 | 0.77 | 0.76 | 0.75 | 0.73 | 0.75 | 0.72 | 0.71 | 0.72 | 0.71 | 0.74 | 0.72 | 0.73 | 0.72 | 0.72 | 0.73 | 0.74 | 0.71 | 0.72 | 0.71 | 0.70 | 0.70 | 0.70 | 0.72 | 0.71 | 0.73 |
| | 831 | 1.18 | 1.15 | 1.12 | 1.10 | 1.10 | 1.09 | 1.06 | 1.08 | 1.05 | 1.03 | 1.05 | 1.05 | 1.06 | 1.04 | 1.06 | 1.07 | 1.07 | 1.08 | 1.07 | 1.07 | 1.07 | 1.10 | 1.10 | 1.09 | 1.07 | 1.08 |
| | 1023 | 1.65 | 1.66 | 1.66 | 1.66 | 1.65 | 1.66 | 1.63 | 1.62 | 1.63 | 1.61 | 1.60 | 1.61 | 1.64 | 1.60 | 1.59 | 1.59 | 1.61 | 1.59 | 1.66 | 1.62 | 1.63 | 1.63 | 1.63 | 1.64 | 1.63 | 1.63 |

FIG. 10

| TONE | Position in main scanning direction |||||||||||||||||||||||||
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 63 | 0.00 | 0.01 | 0.01 | 0.01 | 0.01 | 0.01 | 0.01 | 0.01 | 0.01 | 0.01 | 0.01 | 0.00 | 0.00 | 0.00 | 0.01 | 0.00 | 0.00 | 0.00 | 0.00 | -0.01 | -0.01 | -0.02 | -0.02 | -0.02 | -0.02 |
| 255 | 0.02 | 0.02 | 0.02 | 0.02 | 0.01 | 0.01 | 0.01 | 0.00 | 0.00 | 0.00 | 0.00 | 0.00 | 0.00 | 0.00 | 0.00 | 0.00 | 0.00 | -0.01 | -0.01 | -0.01 | -0.02 | -0.02 | -0.02 | -0.02 | -0.02 |
| 447 | 0.04 | 0.05 | 0.04 | 0.04 | 0.02 | 0.02 | 0.01 | 0.00 | 0.00 | 0.00 | 0.00 | -0.01 | -0.01 | -0.01 | -0.01 | -0.01 | -0.01 | -0.02 | -0.02 | -0.02 | -0.02 | -0.02 | -0.02 | -0.02 | -0.02 |
| 639 | 0.05 | 0.05 | 0.04 | 0.04 | 0.03 | 0.02 | 0.01 | 0.00 | 0.00 | -0.02 | 0.00 | 0.00 | -0.01 | -0.01 | -0.01 | -0.01 | -0.01 | -0.02 | -0.02 | -0.02 | -0.02 | -0.03 | -0.03 | -0.03 | -0.02 |
| 831 | 0.07 | 0.06 | 0.06 | 0.05 | 0.03 | 0.02 | 0.01 | 0.00 | -0.01 | -0.01 | 0.00 | -0.01 | -0.01 | -0.02 | -0.03 | -0.02 | -0.01 | -0.01 | -0.02 | -0.02 | -0.02 | -0.02 | -0.02 | -0.02 | -0.02 |
| 1023 | 0.03 | 0.03 | 0.03 | 0.04 | 0.02 | 0.02 | 0.01 | 0.00 | 0.00 | -0.01 | 0.00 | 0.00 | -0.01 | -0.01 | -0.02 | 0.00 | -0.01 | -0.01 | 0.00 | -0.02 | -0.01 | -0.01 | 0.00 | -0.01 | 0.00 |

IMAGE FORMING APPARATUS THAT CORRECTS DENSITY UNEVENNESS IN A MAIN SCANNING DIRECTION

BACKGROUND OF THE INVENTION

Field of the Invention

The present disclosure relates to an image forming apparatus configured to correct density unevenness in an image to be formed.

Description of the Related Art

An electrophotographic image forming apparatus is configured to form an image by scanning a photosensitive member with laser light. The image forming apparatus is configured to form an electrostatic latent image on the photosensitive member by causing an exposure device to irradiate the photosensitive member with laser light corresponding to the image to be formed. A position to be irradiated with the laser light by the exposure device moves in one direction on the photosensitive member. The direction in which the position to be irradiated with the laser light moves is a main scanning direction. The electrostatic latent image formed on the photosensitive member is developed with toner to form a toner image. The toner image is transferred to paper or other sheets, for example. On the sheet having the toner image transferred thereto, the image is fixed by fixing processing by a fixing device. The sheet having the image formed thereon as described above is obtained as a product.

The image on the product may fluctuate in tone due to fluctuations in environmental conditions, such as a temperature and a humidity, a change with time, aging of members after endurance, and other factors. Further, due to sensitivity unevenness of the photosensitive member in the main scanning direction, reductions at ends in output amount of the laser light with which the photosensitive member is irradiated, lens aberration, and other factors, density unevenness and color unevenness may occur in the image on the product even when the exposure device exposes the photosensitive member with laser light of even energy. In general, effects of the above-mentioned unevenness are more significant in the main scanning direction than in a sub-scanning direction, which is orthogonal to the main scanning direction.

In Japanese Patent Application Laid-open No. 2009-192896, there is proposed a method of generating a conversion condition for correcting density unevenness in a main scanning direction without being affected by density unevenness in a sub-scanning direction. In this method, test images corresponding to one page, which are formed at a constant image density in the main scanning direction and the sub-scanning direction, are generated on a plurality of pages while the image density is changed stepwise for each page. On the basis of detection results of density distributions of the test images on the plurality of pages, the conversion condition for the main scanning direction is generated.

In the method of Japanese Patent Application Laid-open No. 2009-192896, it is required that an image forming apparatus outputs the same number of test charts (each of which is formed of test images corresponding to one page) as the number of tones for which image densities are to be measured. Therefore, a large number of test charts are required.

SUMMARY OF THE INVENTION

An image forming apparatus according to the present disclosure includes an image forming unit that includes a photosensitive member; a charger that charges the photosensitive member; an exposure light source that exposes the photosensitive member to form an electrostatic latent image on the photosensitive member charged by the charger; and a developing sleeve that develops the electrostatic latent image on the photosensitive member, wherein the image forming unit is configured to form an image developed on the photosensitive member. The image forming apparatus further includes a converter configured to convert image data based on a plurality of tone correction conditions corresponding to a plurality of positions in a predetermined direction orthogonal to a rotation direction of the photosensitive member; a memory configured to store a plurality of feedback conditions corresponding to a plurality of tones; and a controller configured to control the image forming unit to form a test image having a plurality of tones on a recording medium; acquire a measurement result related to the test image formed on the recording medium; and generate the plurality of tone correction conditions based on the measurement result and a plurality of feedback conditions, wherein the plurality of feedback conditions includes a first feedback condition for a first tone, and a second feedback condition for a second tone, wherein the first tone differs from the second tone, wherein the first feedback condition differs the second feedback condition, and wherein the image forming unit forms an output image on a recording medium based on image data converted by the converter.

Further features of the present invention will become apparent from the following description of exemplary embodiments (with reference to the attached drawings).

BRIEF DESCRIPTION OF THE DRAWINGS

FIG. 10 is an exemplary diagram of density differences.

DESCRIPTION OF THE EMBODIMENTS

Overall Configuration

Figure 1:
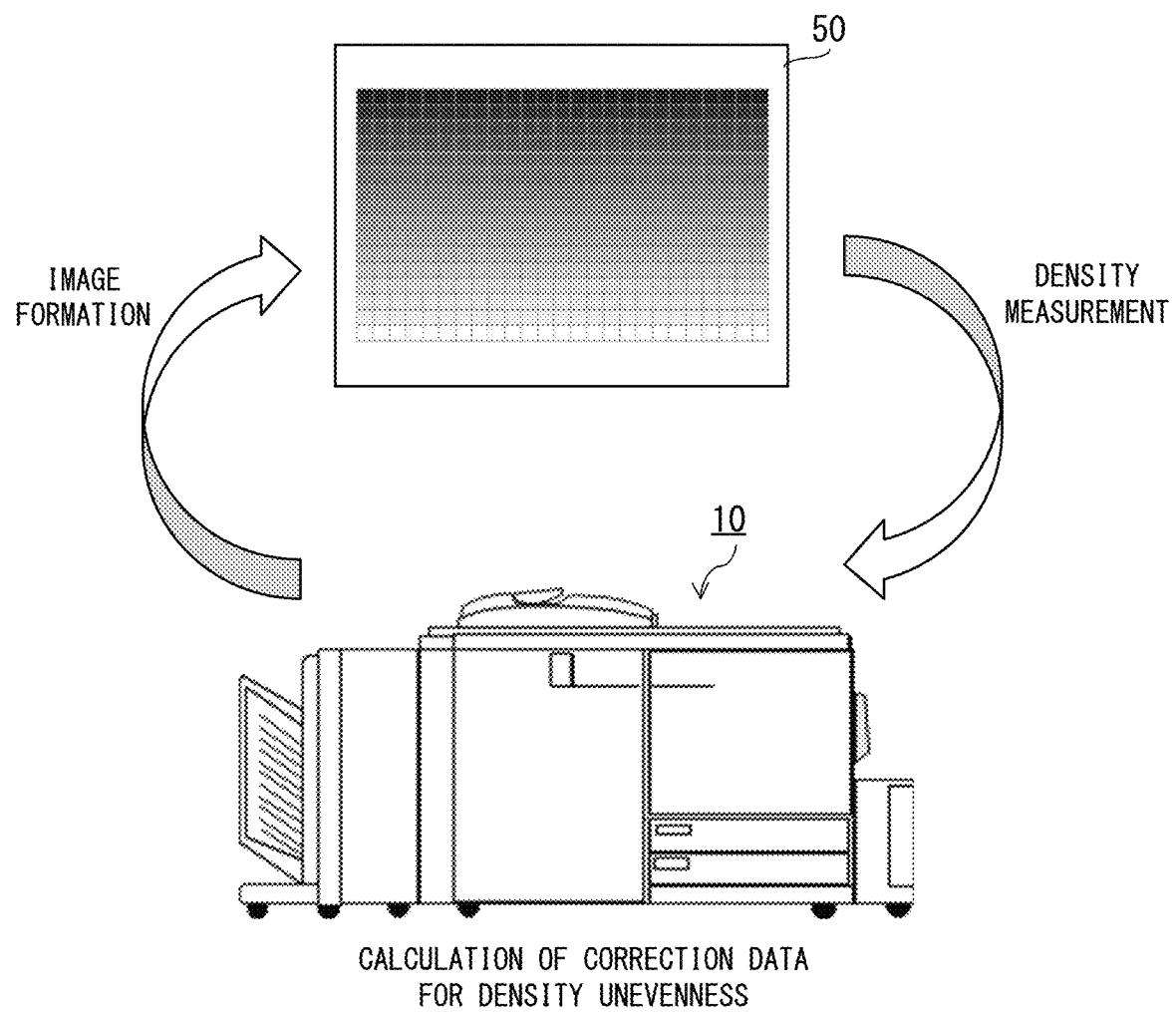
FIG. 1 is an explanatory diagram of density unevenness correction.

FIG. 1 is an explanatory diagram of density unevenness correction. With reference to FIG. 1, an image forming apparatus and a test chart are described. A test chart 50 is used for adjusting image densities of an image forming apparatus 10. The image forming apparatus is configured to form an image by causing an exposure device to irradiate a drum-shaped photosensitive member (hereinafter referred to as "photosensitive drum") with laser light modulated in accordance with the image to be formed. A position to be irradiated with the laser light moves in one direction on the photosensitive drum. The photosensitive drum is configured to rotate about a drum shaft. A two-dimensional image is formed on the photosensitive drum with the position to be irradiated with the laser light moving in the one direction while the photosensitive drum rotates.

The direction in which the position to be irradiated with the laser light moves is a main scanning direction. A direction (direction of rotation of the photosensitive drum) orthogonal to the main scanning direction is a sub-scanning direction. The sub-scanning direction is the same as a conveyance direction in which a sheet as a recording medium is conveyed along a sheet passage during the image formation. The test chart 50 is a density sample sheet, which is a sheet having formed thereon test images for detecting density unevenness in the main scanning direction for each tone.

The image forming apparatus 10 is a multifunction peripheral capable of executing a copy job, a scan job, a print job, and other jobs. A copy job is a job of optically reading an image on an original and printing a copy image of the image on a sheet. A scan job is a job of storing or transmitting to an external device scan data indicating the image read from the original. A print job is a job of printing, on a sheet, an output image based on image data transferred from a personal computer or other external devices.

In a case where the density unevenness is to be corrected, the image forming apparatus 10 first forms the test images on a sheet to generate the test chart 50. The image forming apparatus 10 optically reads the test images formed on the test chart 50 to measure the image densities. The image forming apparatus 10 calculates a density difference (density unevenness) between each of measurement results (actually measured values) of the image densities of the test chart 50 and an average density in the main scanning direction, and calculates correction data for correcting the density unevenness.

Image Forming Apparatus

Figure 2:
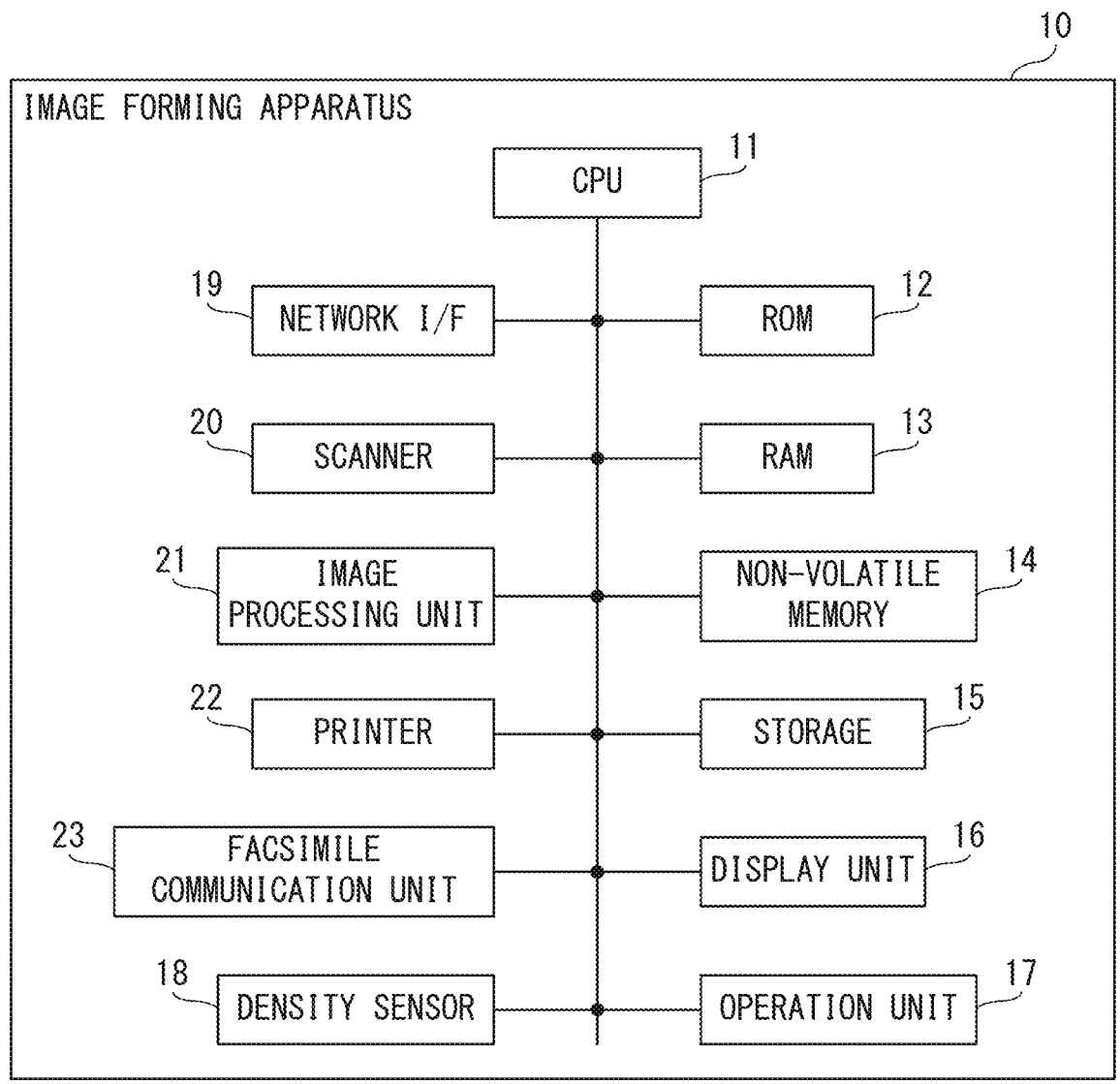
FIG. 2 is an explanatory configuration diagram of an image forming apparatus.

FIG. 2 is an explanatory configuration diagram of the image forming apparatus 10. In order to execute the various jobs described above, the image forming apparatus 10 includes a network interface (I/F) 19, a scanner 20, a printer 22, and a facsimile communication unit 23. The image forming apparatus 10 includes, for operation control, a central processing unit (CPU) 11, a read only memory (ROM) 12, and a random access memory (RAM) 13. The image forming apparatus 10 further includes a non-volatile memory 14, a storage 15, a display unit 16, an operation unit 17, an image processing unit 21, and a density sensor 18.

The CPU 11 is configured to execute, for example, middleware or an application program on an operating system. The ROM 12 is configured to store various computer programs. The CPU 11 is configured to achieve various functions of the image forming apparatus 10 by executing the various computer programs stored in the ROM 12. The RAM 13 is used as, for example, a work memory configured to temporarily store various kinds of data in a case where the CPU 11 executes a computer program, and an image memory configured to store image data transferred from an external device. The CPU 11 is configured to derive the correction data for correcting density unevenness in the main scanning direction, and to convert an image signal value, which is used at the time of the image formation, based on the correction data. The image signal value is included in the image data, and indicates a characteristic (color, brightness, or the like) of each pixel. The correction data used for converting the image signal value is a conversion condition for converting the image data.

The non-volatile memory 14 is a rewritable memory (for example, flash memory) capable of holding written data even when the image forming apparatus 10 is powered off. In the non-volatile memory 14, information specific to the image forming apparatus 10, various pieces of setting information, and other data are recorded. The storage 15 is a hard disk drive (HDD), a solid state drive (SSD), or other non-volatile large-capacity storage device. The storage 15 is configured to store programs of the operating system, various application programs, the image data, history of information on jobs, and other data.

The display unit 16 is formed of, for example, a liquid crystal display (LCD), and is an output interface configured to display screens used for various operations and settings, and screens indicating statuses of the image forming apparatus 10. The operation unit 17 is an input interface configured to receive various operations, such as an input of a job and a change to a setting, from a user. The operation unit 17 includes a touch panel provided on the screen of the display unit 16 and configured to detect a depressed coordinate position, and numeric keys, character input keys, and a start key outside the screen, among others.

The network I/F 19 is a communication interface configured to communicate to/from, for example, an external device connected via a local area network (LAN) or other networks. At the time of a print job, image data transferred from the external device via the network I/F 19 is used as the image information. The facsimile communication unit 23 is a communication interface configured to communicate via a public communication line for facsimile transmission and reception. At the time of the facsimile reception, image data transferred via the facsimile communication unit 23 is used as the image information.

The scanner 20 is configured to optically read the image on the original, and to generate image data indicating the read image. For example, the scanner 20 includes a light source configured to irradiate the original with light, a line image sensor configured to receive reflected light of the light from the light source and read the original line by line in a width direction (main scanning direction), and an optical system. The optical system is formed of lenses, mirrors, and other elements, and is configured to guide the reflected light from the original to the line image sensor to form an image. The scanner 20 is configured to read the image on the original while sequentially moving a line-by-line reading position in a length direction (sub-scanning direction) of the original. The scanner 20 is configured to convert an analog image signal output from the line image sensor into digital image data. At the time of a copy job, the image data generated by the scanner 20 is used as the image information. At the time of a scan job, the image data generated by the scanner 20 is stored in the storage 15, or is transmitted to the external device via the network I/F 19. At the time of the facsimile transmission, the image data generated by the scanner 20 is transmitted via the facsimile communication unit 23.

The image processing unit 21 is configured to perform, in addition to scaling, rotation, and other processing of an image, rasterization in which the image data is converted into raster image data, compression and decompression processing of the image data, and other processing. At the time when the image formation is performed, the image processing unit 21 performs rasterization and other image processing on the image data. At the time when the image data is transmitted and received via the network I/F 19 or the facsimile communication unit 23, the image processing unit 21 performs the compression and decompression processing on the image data. The image processing unit 21 is configured to convert the image data that has been subjected to the image processing with the use of the correction data (tone correction condition) corresponding to a position (main scanning position) in the main scanning direction of the image data.

The printer 22 is configured to form an image on a sheet based on the image data. The printer 22 is, for example, what is called a laser printer configured to perform the image formation by an electrophotographic process. The printer 22 is an image forming unit including a sheet conveying mechanism, the photosensitive drum, a charging device, the exposure device, a developing device, a transfer roller, a cleaner, a fixing device, and other components. A surface of the photosensitive drum is uniformly charged by the charging device. The charging device has a charging wire. Another type of the charging device has charging drum. The exposure device is configured to scan the uniformly charged surface of the photosensitive drum with the laser light in the main scanning direction. The exposure device has exposure light source that irradiates the laser light. The laser light is modulated in accordance with the image data. As a result, an electrostatic latent image corresponding to the image data is formed on the photosensitive drum. The developing device is configured to develop the electrostatic latent image to form a toner image on the photosensitive drum. The developing device has a developing sleeve. The toner carried on the developing sleeve is electrically supplied to the photosensitive drum. The transfer roller is configured to transfer the toner image from the photosensitive drum to a sheet that has been conveyed by the conveying mechanism. Toner remaining on the photosensitive drum after the transfer is removed by the cleaner. To the sheet having the toner image transferred thereto, the toner image is fixed by the fixing device. As a result, the sheet having the image formed thereon is obtained as a product. In a case of performing the image formation (printing), the exposure device repeatedly forms an electrostatic latent image corresponding to one line in the main scanning direction on the photosensitive drum. The formation of the electrostatic latent image corresponding to one line in the main scanning direction is performed through movement in the sub-scanning direction with rotation of the photosensitive drum. The transfer of the image formation on an object (sheet) is performed while moving the sheet in the sub-scanning direction. As a result, the two-dimensional image is formed on the sheet.

The density sensor 18 is used to measure image density distributions of the test chart 50 generated by the printer 22 forming the test images on a sheet. The density sensor 18 is configured to read the test chart 50 by a light source configured to irradiate the test chart 50 with light of colors of red (R), green (G), and blue (B), and a sensor configured to receive reflected light, which is the light reflected by the test chart 50. The light source is, for example, a light emitting diode (LED). The sensor is, for example, a photodiode. The density sensor 18 is configured to output an electrical signal indicating the reflected light received by the sensor. This electrical signal is converted into the image densities by the CPU 11.

The density sensor 18 is provided inside the image forming apparatus 10, and is capable of reading the test images line by line before the test chart 50 is discharged to the outside of the apparatus. As with the density sensor 18, the scanner 20 can be used to measure the image density distributions of the test chart 50. The scanner 20 reads the test images from the test chart 50 after the test chart 50 is discharged to the outside of the apparatus. In processing of correcting the image densities, the test chart 50 is read with the use of any one of the density sensor 18 and the scanner 20. In the following description, the scanner 20 and the density sensor 18 are described as a "reading apparatus" without distinguishing the scanner 20 and the density sensor 18.

(Density Correction)

As described with reference to FIG. 1, the image forming apparatus 10 generates the test chart 50 by the printer 22. The image forming apparatus 10 measures the image density distributions of the test images based on results of reading the test chart 50 by the reading apparatus. The image forming apparatus 10 detects the density unevenness in the main scanning direction of the test images from the measurement results of the image density distributions. The image forming apparatus 10 calculates the correction data for correcting the image signal value so that the effect of the density unevenness in the main scanning direction is reduced at the time of the subsequent image formation (at the time of printing). The image processing unit 21 corrects the image signal value included in the image data based on the correction data at the time of the image formation. The printer 22 performs the image formation based on the image data corrected by the image processing unit 21.

The image forming apparatus 10 generates, in calculating the correction data, corrected density distribution data based on image density distribution data (density distribution profiles) generated based on the results of reading the test chart 50. The image forming apparatus 10 calculates a required correction amount for correcting the density unevenness based on the corrected density distribution data.

In a case where the density distribution data is generated by reading a small number of test charts 50, the correction data is generated under a state in which unsteady unevenness occurs. The unsteady unevenness occurs due to splattering of toner at the time of transferring the toner image, development unevenness caused by the fact that the photosensitive drum and a developing sleeve in the developing device are not completely circular, a shock during conveyance of the sheet, unevenness in triboelectric charging of toner, and other factors.

Figure 3:
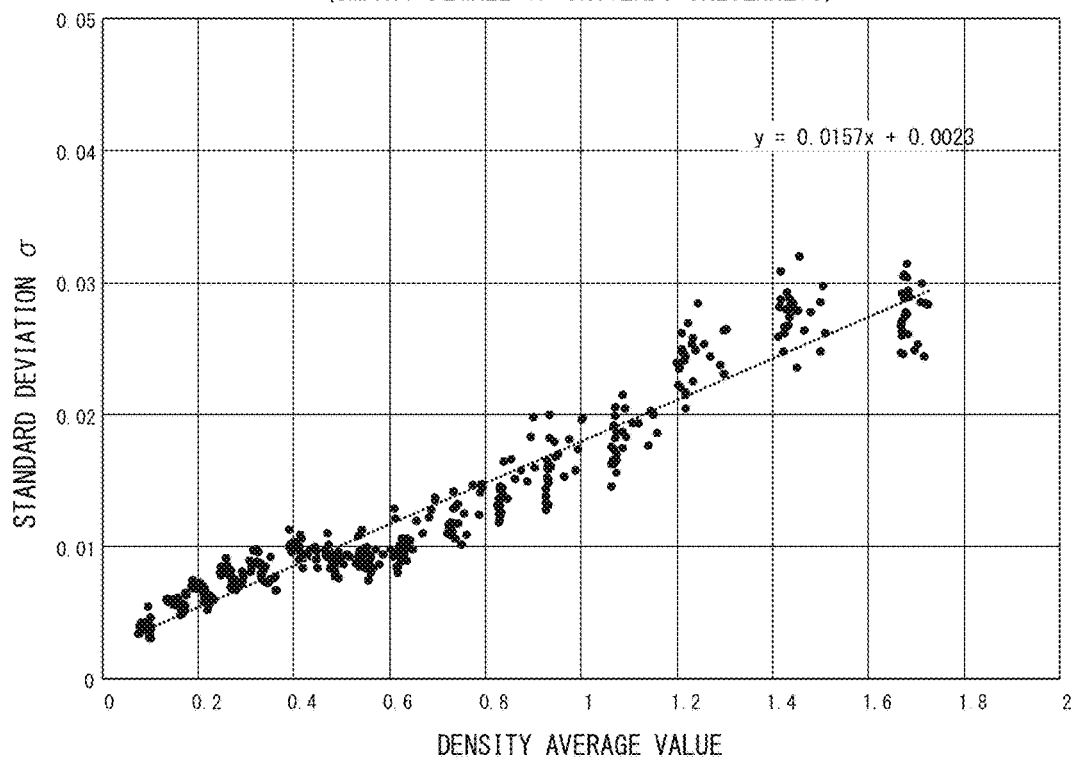
FIG. 3 is an explanatory graph of a relationship between an impact degree of unsteady unevenness and a tone level.

Susceptibility to the unsteady unevenness is different depending on a tone (density) level. Therefore, a likelihood that the density distribution data generated based on the small number of test charts 50 indicates an actual condition of the image forming apparatus 10 is different depending on the tone level. FIG. 3 is an explanatory graph of a relationship between an impact degree of the unsteady unevenness and the tone level. FIG. 3 shows a variation of the measurement results of the image densities for each tone level. It can be seen that, as the tone (density) becomes denser, the variation of the measurement results of the image densities becomes larger. Plot points at substantially the same tone level are pieces of data for each section in the main scanning direction.

Figure 4:
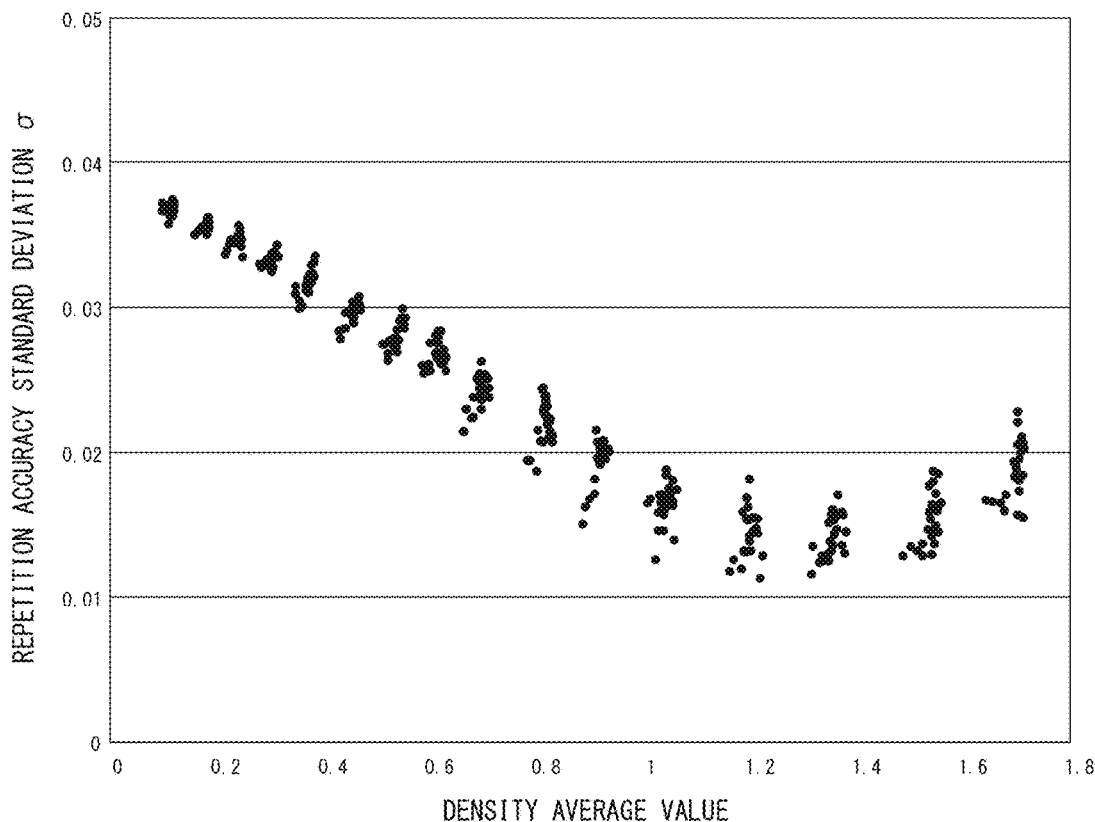
FIG. 4 is an explanatory graph of a relationship between repetition accuracy of a reading apparatus and the tone level.

Repetition accuracy (standard deviation σ) of the reading apparatus configured to read the test charts 50 is also different depending on the tone level. As described above, the reading apparatus (the density sensor 18 or the scanner 20) is configured to read the test images line by line. To that end, the reading apparatus performs reading operation repeatedly while shifting a reading position line by line in the sub-scanning direction. Accuracy of the repeatedly performed reading operation is different depending on the tone level. In other words, the repetition accuracy of the reading apparatus corresponds to steady unevenness that occurs repeatedly at the time of reading. FIG. 4 is an explanatory graph of a relationship between the repetition accuracy of the reading apparatus and the tone level. Although depending also on a configuration of the reading apparatus, in FIG. 4, there is shown an example of the reading apparatus in which the repetition accuracy of reading is low at a low density level, and the repetition accuracy is increased toward a high density level.

Due to the two effects of the unsteady unevenness and the repetition accuracy of the reading apparatus used in measuring the image densities, it is required to set a correction reflection ratio for each tone level for the measurement results of the image densities as appropriate. The correction reflection ratio is also called a feedback gain (feedback condition). In the image forming apparatus 10, in a case where a proportion of correction of the effect of a density detection error becomes larger than correction of the original density unevenness, continuity of densities at respective positions in the main scanning direction and continuity of the tones are lost. As a result, there is a risk that a false contour and other phenomena may occur in the formed image. To prevent those phenomena, it is required to suppress correction results with the use of the correction reflection ratio. The correction reflection ratio is a factor set for each tone for eliminating the above-mentioned two effects from the measurement results of the image densities. The correction reflection ratio is stored in, for example, the non-volatile memory 14, and used in measuring the image densities.

Figure 5:
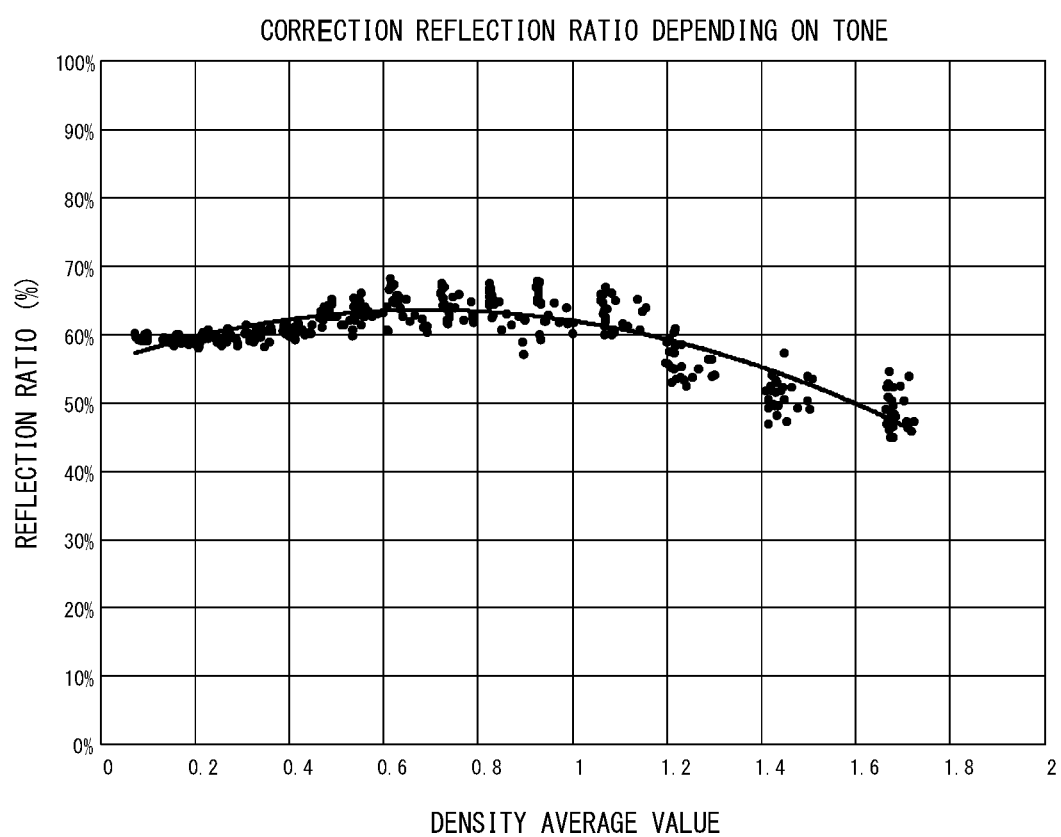
FIG. 5 is an explanatory graph of a correction reflection ratio.
Figure 6A:
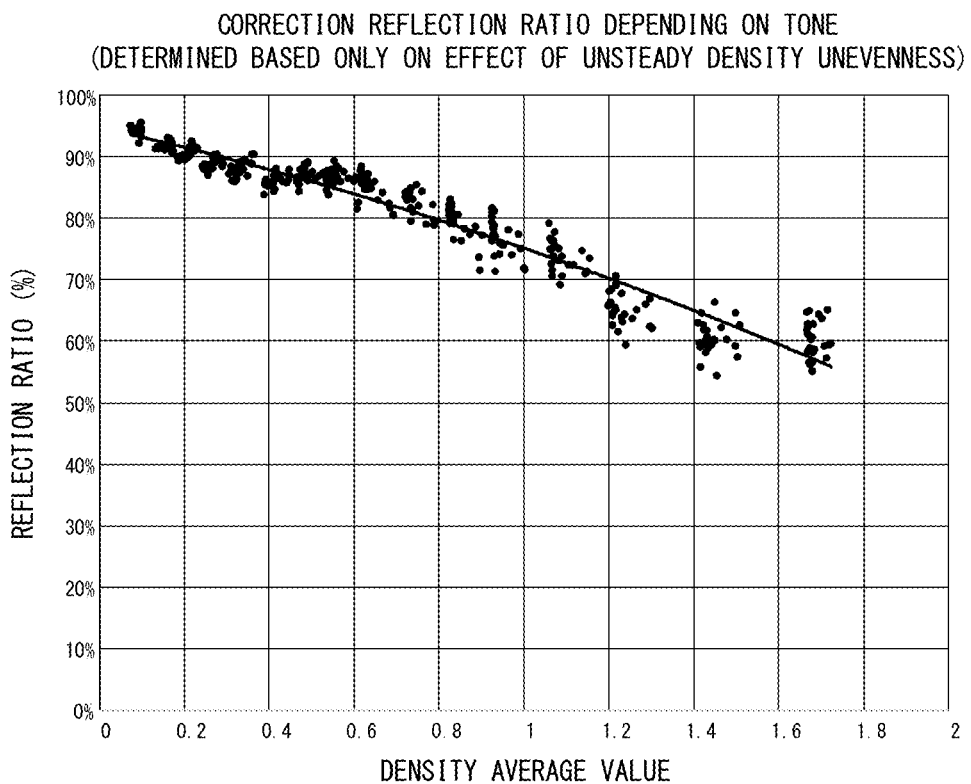
FIG. 6A and FIG. 6B are explanatory graphs of data for determining the correction reflection ratio.
Figure 6B:
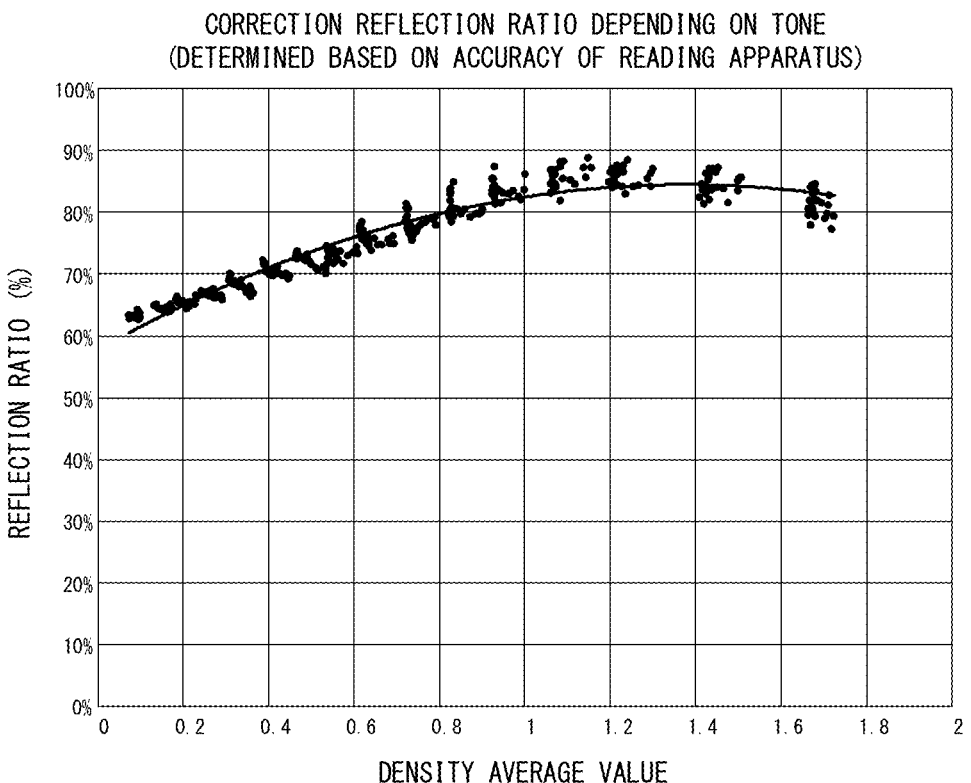

FIG. 5 is an explanatory graph of the correction reflection ratio determined depending on the tone in order to reduce the two effects of the unsteady unevenness and the repetition accuracy of the reading apparatus used in measuring the image densities. The solid line indicates the correction reflection ratio depending on the tone. FIG. 6A and FIG. 6B are explanatory graphs of data for determining the correction reflection ratio of FIG. 5. FIG. 6A shows a correction reflection ratio intended to reduce only the effect of the unsteady unevenness. FIG. 6B shows a correction reflection ratio intended to reduce only the effect of the repetition accuracy of the reading apparatus. The correction reflection ratio of FIG. 5 indicates a characteristic obtained by multiplying the two correction reflection ratios of FIG. 6A and FIG. 6B together. The CPU 11 generates the correction reflection ratio of FIG. 5 by multiplying the correction reflection ratio intended to reduce only the effect of the unsteady unevenness by the correction reflection ratio intended to reduce only the effect of the repetition accuracy of the reading apparatus. Here, as a result of studies by the inventors of the present disclosure, it has been found that, in a case where a correction reflection ratio on the low density side is reduced as compared to a correction reflection ratio on the high density side, the unsteady unevenness can be suppressed, and at the same time, the repetition accuracy of the reading apparatus used in measuring the image densities can be ensured. It has been found that, for example, the correction reflection ratio on the high density side of an image density of 1.5 is preferably set higher than the correction reflection ratio on the low density side of the image density of 1.5.

Figure 7:
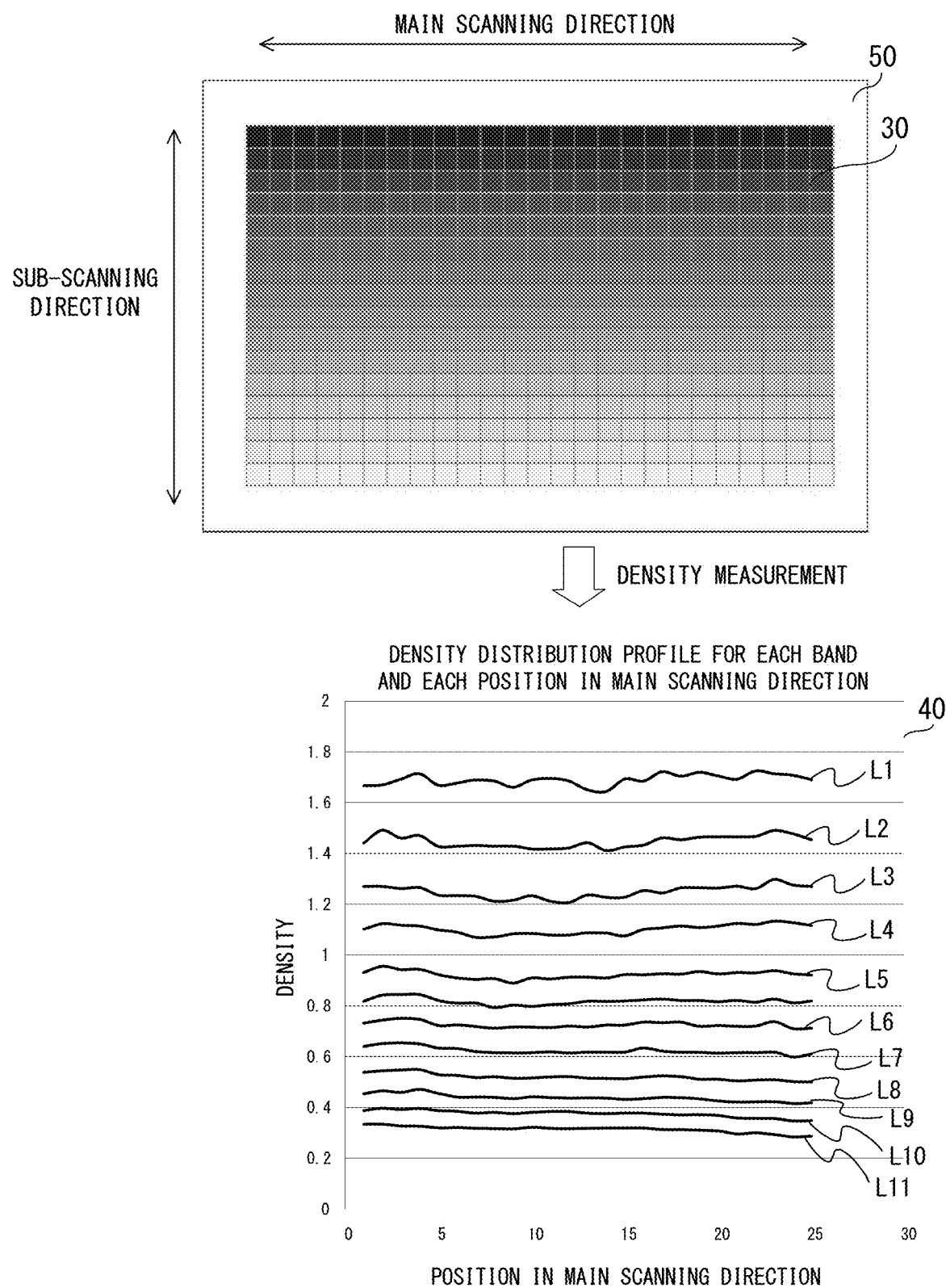
FIG. 7 shows an explanatory diagram and a graph of a test chart and density distribution profiles.

FIG. 7 shows an explanatory diagram and graph of the test chart 50 and the density distribution profiles. The printer 22 forms test images 30 on the sheet based on test image data. In the following description, the sheet having the test images 30 formed thereon is the test chart 50. Density distribution profiles 40 show image density distributions obtained by measuring density distributions of the test chart 50 as graphs.

The test images 30 are a plurality of monochrome band images, which extend in the main scanning direction so as to be arranged next to and side by side with each other in density order in the sub-scanning direction. The monochrome band images are different in density. Colors of the band images are black at the maximum density and white at the minimum density, and the band images therebetween have colors of density values that are sequentially different so as to have even density differences. The band images have a length that is substantially equal to a width over which the printer 22 can form an image in the main scanning direction. A width of the band images in the sub-scanning direction is set as appropriate in a range in which the image densities can be measured. As the test images 30, band images of densities of sixteen levels from white to black are arranged in density order in the sub-scanning direction.

The density distribution profiles 40 indicate the density distributions of the band images as the test images 30 for each position in the main scanning direction of the test chart 50. The test images 30 are formed of sixteen band images, and hence the density distribution profiles 40 also show image densities for each position in the main scanning direction for the sixteen band images. In the image signal value of the test image data indicating the test images 30, the density of each of the band images is set to be uniform. Therefore, in a case where the density is directly reproduced on the sheet, the image density for each position in the main scanning direction of each of the band images in the density distribution profiles 40 is indicated by a straight line. However, in a case where density unevenness occurs in the main scanning direction at the time of forming the images, the image density fluctuates for each position in the main scanning direction as shown by the density distribution profiles 40.

Figure 8:
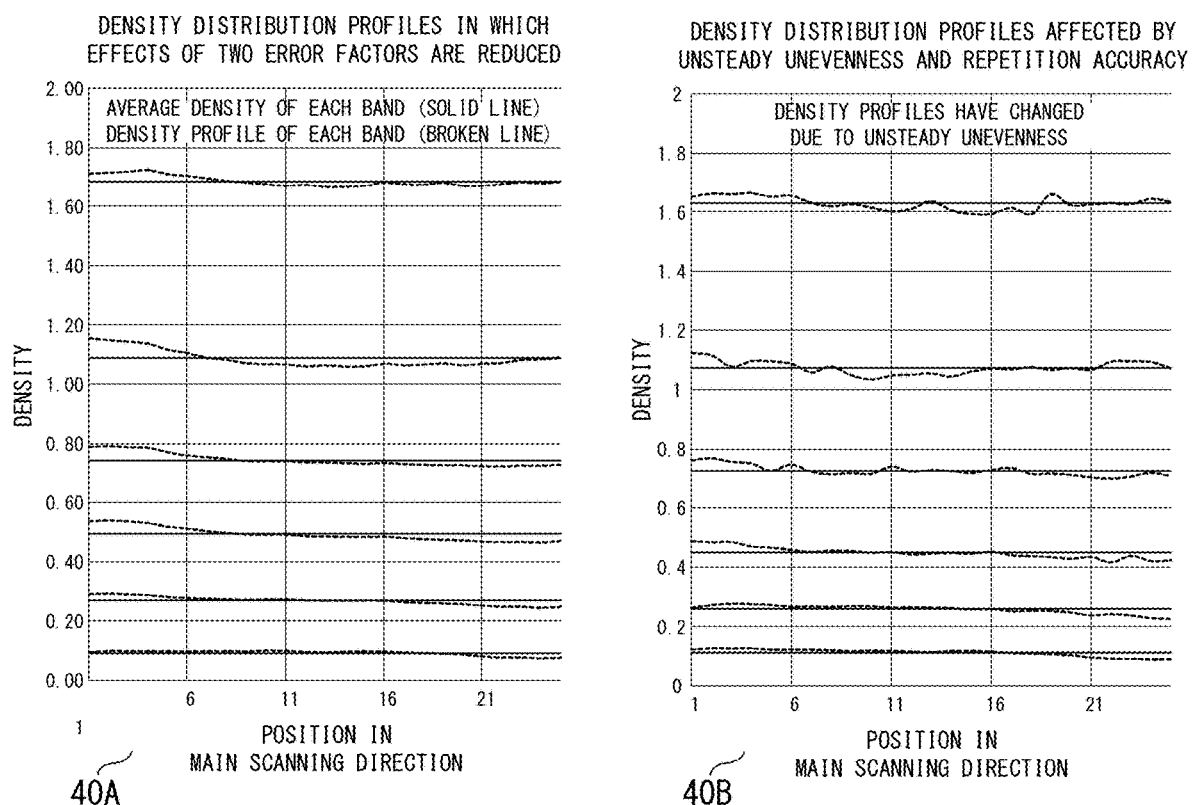
FIG. 8 shows comparative explanatory graphs of density distribution profiles.

FIG. 8 shows comparative explanatory graphs of the density distribution profiles. FIG. 8 shows density distribution profiles 40A eliminating the two effects of the unsteady unevenness and the repetition accuracy of the reading apparatus used in measuring the image densities, and density distribution profiles 40B affected by the two effects. The density distribution profiles 40A are generated, in order to suppress the effects of the unsteady density unevenness and the repetition accuracy at the time of measuring the densities, by forming and measuring densities of fifty test charts 50, and averaging fifty measurement results obtained as a result. The density distribution profiles 40B are generated based on measurement results for one test chart, and are affected by the two effects. Therefore, the density distribution profiles 40B provide different results from the density distribution profiles 40A.

In the density distribution profiles 40A and 40B, six measurement results for the sixteen band images as the test images 30 are shown as excerpts. In FIG. 8, the density distribution profiles 40A and the density distribution profiles 40B are arranged side by side on the same scale. FIG. 8 clearly shows, in the two density distribution profiles 40A and 40B, the straight line (solid line) indicating the average density (density average value) of the density distribution of each of the band images.

In a case where the density distribution profiles 40A and the density distribution profiles 40B are compared to each other, it can be seen that, though being the lines indicating the density distributions of the same band image on the test chart 50, the density distribution profiles in the main scanning direction are different in shape. This shows that, in the density distribution profiles 40B obtained based on the results of reading the one test chart 50, the effects of the unsteady unevenness and the repetition accuracy of the reading apparatus are not suppressed. Therefore, in a case where the density unevenness in the main scanning direction is corrected based on the density distribution profiles 40B, the original characteristics of the image forming apparatus 10 cannot be corrected.

Figure 9:
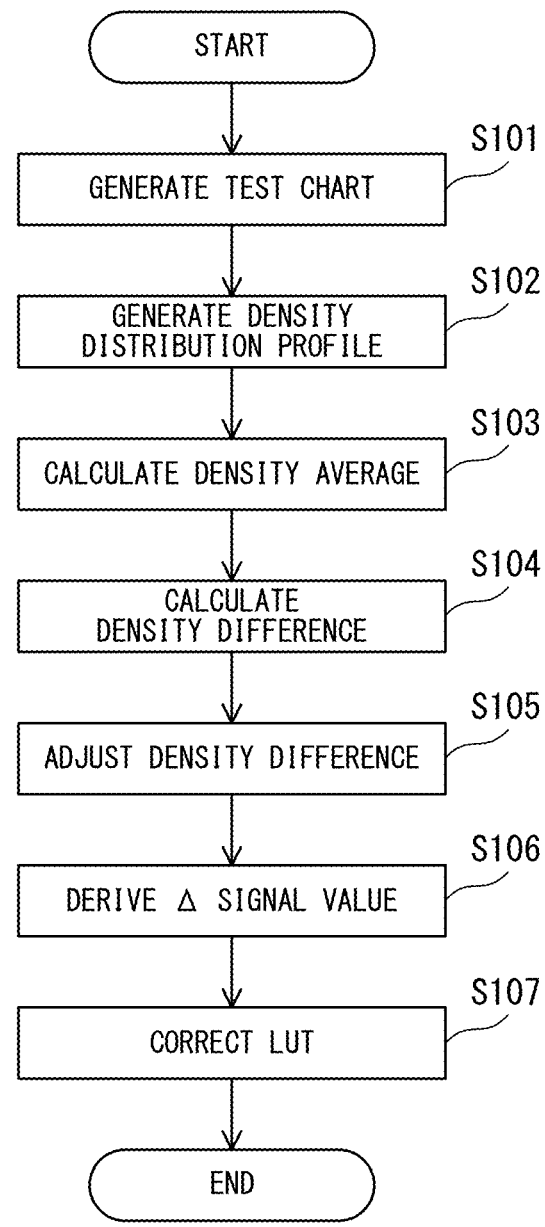
FIG. 9 is a flow chart for illustrating processing of correcting density unevenness.

FIG. 9 is a flow chart for illustrating the processing of generating the correction data (tone correction condition) for the density unevenness correction. The image forming apparatus 10 generates final correction data for density unevenness based on the density distribution profiles obtained based on the results of reading the test chart 50. This processing is performed for each of all the band images on the test chart 50 (test images 30), but processing for a predetermined band image is described here.

The image forming apparatus 10 forms the test images 30 on the sheet by the printer 22 to generate the test chart 50 (Step S101). The test chart 50 is read by the reading apparatus. The image forming apparatus 10 generates one test chart. The CPU 11 measures the density distributions in the main scanning direction of the band images as the test images 30 based on reading results (measurement results) for the test chart 50. The CPU 11 generates the density distribution profiles based on the measured density distributions in the main scanning direction (Step S102). The density distribution profiles generated here are affected not only by the density unevenness in the main scanning direction, which is the original target of correction, but also by the effects of the unsteady unevenness and the repetition accuracy of the reading apparatus.

The CPU 11 calculates the density average value in the main scanning direction, which is indicated by the solid line of FIG. 8, for each tone (Step S103). The CPU 11 calculates a difference (density difference) between the density average value and a density at each position in the main scanning direction for each tone (Step S104). FIG. 10 is an exemplary diagram of the density differences. The calculated density differences are the density unevenness in the main scanning direction. The density unevenness is the target of correction (required correction amount). The density differences include the effects of the two variation factors of the unsteady unevenness and the repetition accuracy of the reading apparatus used in measuring the image densities. The likelihood of the calculated values of the density differences is different depending on the tone, and hence the CPU 11 multiplies the density difference by the correction reflection ratio corresponding to the tone as shown in FIG. 5 to adjust the density difference (Step S105). The correction reflection ratio is described later in detail.

Figure 11:
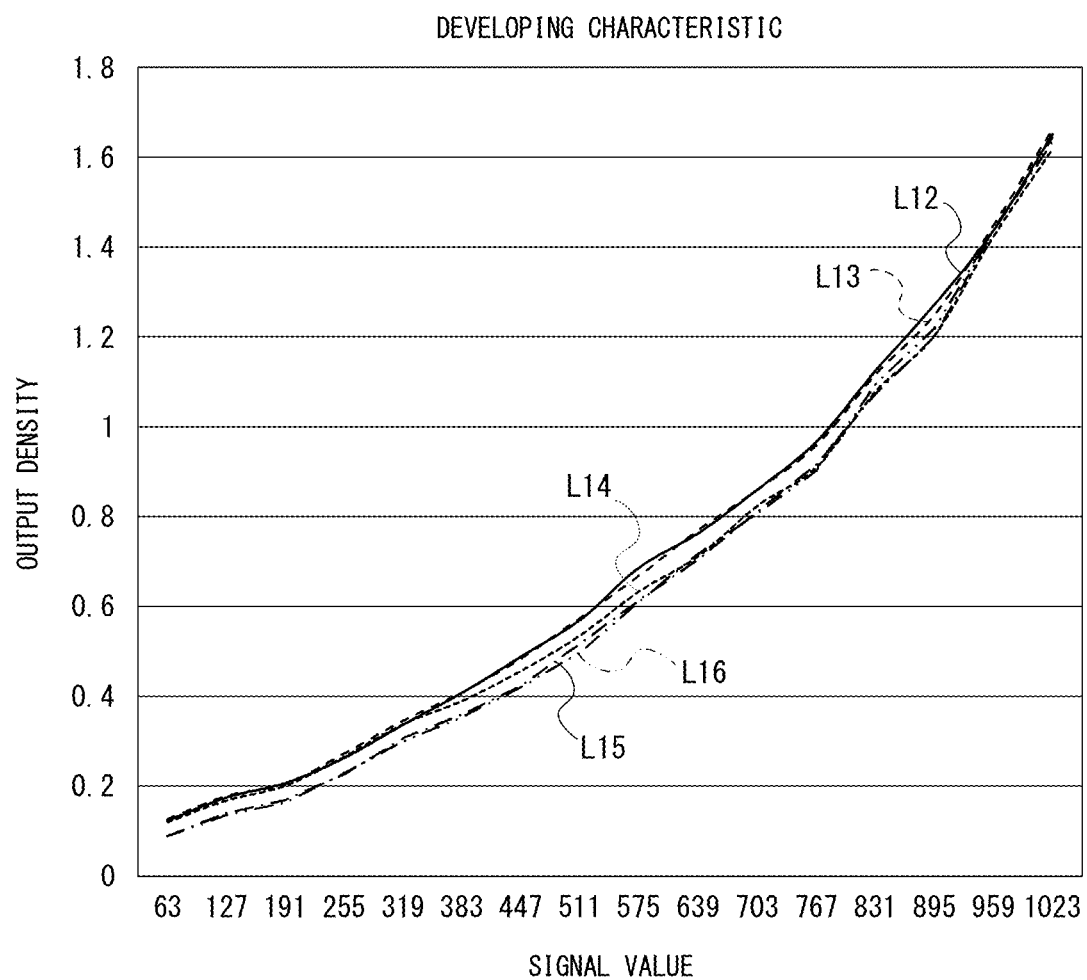
FIG. 11 is an exemplary graph of a density characteristic for each main scanning position.

The CPU 11 derives a Δ signal amount required for correcting the density difference (Step S106). FIG. 11 shows experiment data indicating an actual density characteristic for each main scanning position. In FIG. 11, density characteristics at eighteen positions in the main scanning direction are excerpted. In FIG. 11, among the eighteen positions, the density characteristics of the positions 12, 13, 14, 15, and 16 are shown in L12, L13, L14, L15, and L16, respectively. The CPU 11 calculates the Δ signal amount corresponding to the image signal value for each main scanning position so that a density characteristic, which is what is called a developing characteristic, corresponding to the image signal value becomes an ideal density characteristic. The CPU 11 corrects a look-up table (LUT) for each position in the main scanning direction based on the calculated Δ signal amount (Step S107). The CPU 11 performs this processing for each of all the band images on the test chart 50 (test images 30) to correct each tone in the LUT.

As the test images, the band images corresponding to all the tones in the LUT may not be formed. Tones for which the test images are not formed may be estimated based on correction values of the test images at the same position in the sub-scanning direction.

The image processing unit 21 converts the image data based on the LUT for each main scanning position at the time of normal image formation.

Figure 12:
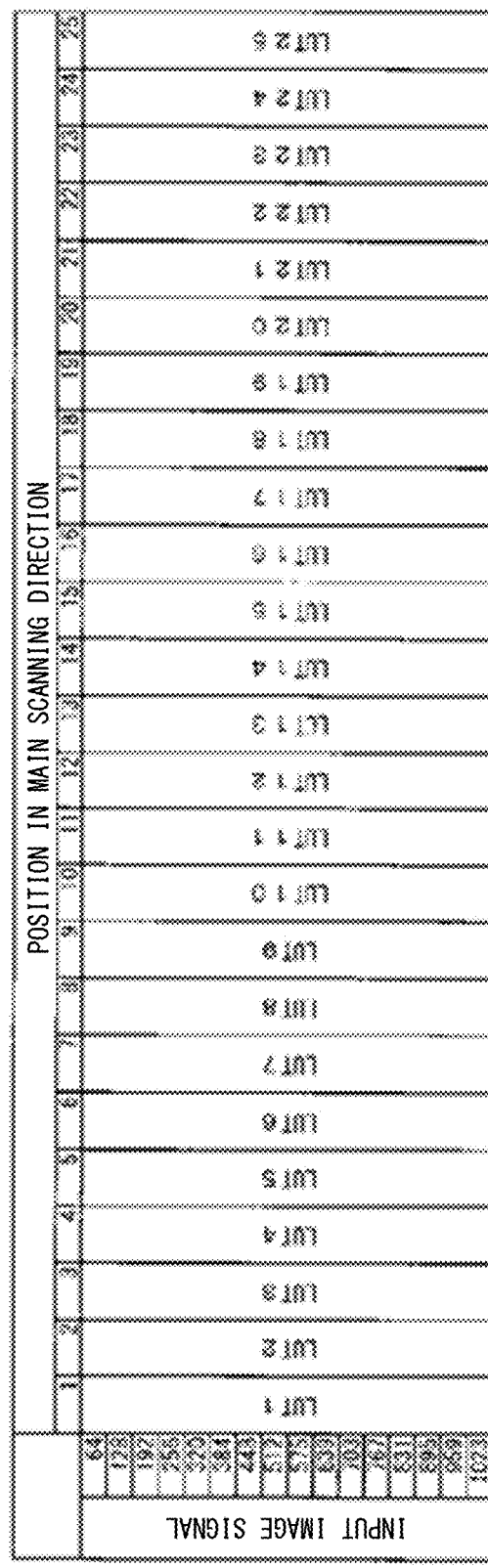
FIG. 12 is an explanatory diagram of a LUT for each position in a main scanning direction.

FIG. 12 is an explanatory diagram of the LUT for each position in the main scanning direction. In FIG. 12, LUTs 1 to 25 for respective positions 1 to 25 in the main scanning direction are exemplified. Each of the LUTs 1 to 25 is a table in which an output image signal (image density) is associated with an input image signal (image signal value). The CPU 11 corrects corresponding data of the LUTs 1 to 25 based on the Δ signal amount. As a method of correcting the density unevenness, the image forming apparatus 10 adjusts the LUT for each position in the main scanning direction, but another method may be adopted.

Figure 13:
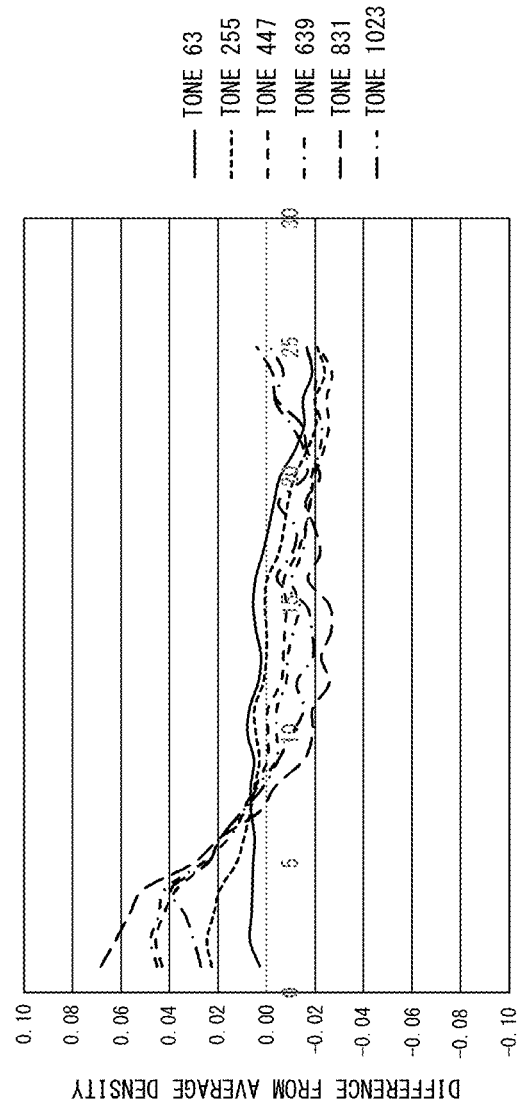
FIG. 13 shows an explanatory diagram and a graph of correction reflection ratios.
Figure 14:
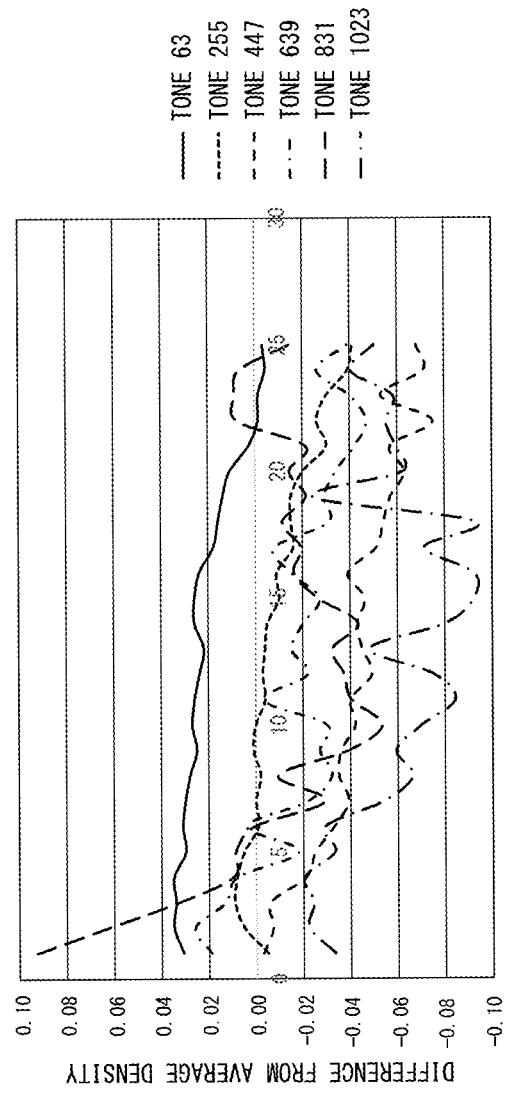
FIG. 14 shows an explanatory diagram and a graph of correction reflection ratios.
Figure 15:
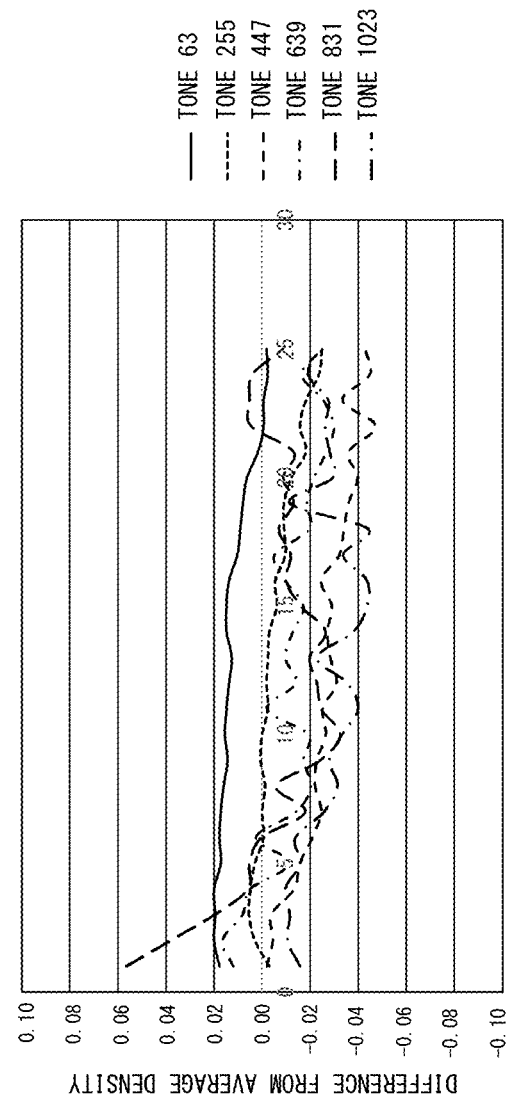
FIG. 15 shows an explanatory diagram and a graph of correction reflection ratios.

FIG. 13 to FIG. 15 show explanatory diagrams and graphs of the correction reflection ratio. FIG. 13 shows results of a density difference for each tone depending on the position in the main scanning direction, which is determined based on a result obtained when the density unevenness in the main scanning direction of the image forming apparatus 10 can be correctly detected without being affected by the error factors in generating the density distribution profiles. FIG. 14 shows density differences calculated based on the measurement results of the density distribution profiles affected by the above-mentioned two error factors. FIG. 15 shows results of multiplying the density difference by a predetermined factor in a form of the correction reflection ratio for each tone considering the effects of the above-mentioned two error factors. In FIGS. 13-15, the tone 63, tone 255, tone 447, tone 639, tone 831, and tone 1023 are shown.

Through suppression of the effects of the errors imposed when the density distribution profiles are measured, the results of FIG. 15 can be brought relatively closer to the results of FIG. 13, which are not affected by the error factors at the time of measurement. Through the use of the correction reflection ratio corresponding to the tone as described above, the effects of the detection errors can be reduced. In other words, reverse correction and overcorrection caused by the detection errors, or a false contour and other correction failures in tone control can be suppressed. Here, the correction reflection ratio is a value of 100%. However, the correction reflection ratio may be 100% or more. Further, in the image forming apparatus 10 according to at least one embodiment of the present disclosure, one test chart is formed, but a plurality of test charts may be formed. The image forming apparatus 10 according to the at least one embodiment can suppress the effects of the errors by using the correction reflection ratio. Therefore, in the image forming apparatus 10 according to the at least one embodiment, the number of test charts required to reduce the effects of the errors can be set to a smaller number.

In the image forming apparatus 10 according to at least one embodiment, the reading apparatus configured to read the test chart 50 may be any one of the scanner 20 and the density sensor 18 as described above. Further, the reading apparatus may be a density measuring apparatus provided outside the image forming apparatus 10. In this case, the test chart 50 generated by the image forming apparatus 10 is read by the external density measuring apparatus, and results of the reading are transmitted to the image forming apparatus 10.

At least one embodiment of the present disclosure has been described with reference to the drawings. However, the specific configuration is not limited to those described in the at least one embodiment, and the present disclosure encompasses any changes or additions made thereto without departing from the spirit of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-146646, filed Aug. 8, 2019, which is hereby incorporated by reference herein in its entirety.

What is claimed is:

1. An image forming apparatus, comprising:
   an image forming unit configured to form an image, the image forming unit including:
      a photosensitive member;
      a charger that charges the photosensitive member;
      an exposure light source that exposes the photosensitive member to form an electrostatic latent image on the photosensitive member charged by the charger, wherein exposure light from the exposure light source scans the photosensitive member in a main scanning direction; and
      a developing sleeve that develops the electrostatic latent image on the photosensitive member; and
   a controller configured to:
      control the image forming unit to form a first test image based on a first image signal value and a second test image based on a second image signal value different from the first image signal value;
      acquire first data which is related to the first test image and second data which is related to the second test image, wherein the first data and the second data are to be output from a reading device;
      control, based on first correction amounts corresponding to a plurality of positions in the main scanning direction, density unevenness in the main scanning direction of a first image which is to be formed based on the first image signal value, wherein the first correction amounts are obtained for each of the plurality of positions in the main scanning direction by multiplying, by a first coefficient, differences between a target value of the first test image and each of reading values of the plurality of positions in the main scanning direction included in the first data; and
      control, based on second correction amounts corresponding to the plurality of positions in the main scanning direction, density unevenness in the main scanning direction of a second image which is to be formed based on the second image signal value, wherein the second correction amounts are obtained for each of the plurality of positions in the main scanning direction by multiplying, by a second coefficient which is lower than the first coefficient, differences between a target value of the second test image and each of reading values of the plurality of positions in the main scanning direction included in the second data,
   wherein a density of the second image is lower than a density of the first image.

2. The image forming apparatus according to claim 1, further comprising a converter configured to convert an image signal based on a plurality of tone correction conditions corresponding to a plurality of positions in the main scanning direction,
   wherein the controller controls the density unevenness in the main scanning direction by generating the plurality of tone correction conditions based on the first correction amounts and the second correction amounts.

3. The image forming apparatus according to claim 1,
   wherein the target value of the first test image corresponds to an average of densities at the plurality of positions included in the first data, and
   wherein the target value of the second test image corresponds to an average of densities at the plurality of positions included in the second data.

4. The image forming apparatus according to claim 1,
   wherein the density of the first image is higher than 1.5, and
   wherein the density of the second image is lower than 1.5.

5. The image forming apparatus according to claim 1, wherein the first test image and the second test image are formed on a same recording material.

6. An image forming apparatus, comprising:
   an image forming unit configured to form an image on a sheet; and
   a controller configured to:
      control the image forming unit to form test images having a plurality of tones on the sheet;
      acquire reading data related to the test images on the sheet, wherein the reading data is output from a reading device;
      generate, based on the reading data, characteristic data related to density unevenness in a main scanning direction, the characteristic data including data corresponding to each of the plurality of tones and data corresponding to another tone different from the plurality of tones;
      generate conversion data for amending the density unevenness in the main scanning direction based on the characteristic data and a feedback condition which is used for controlling a suppression amount of the density unevenness, the feedback condition including a first feedback condition corresponding to a first tone and a second feedback condition corresponding to a second tone lower than the first tone, the first feedback condition being less than the second feedback condition, and both the first tone and the second tone being included in a low density range; and control, based on the conversion data, the density in the main scanning direction of an image to be formed by the image forming unit.

7. The image forming apparatus according to claim 6, further comprising an image processor configured to perform image processing on image data,
wherein the image forming unit is configured to form an image based on the image data output from the image processor, and
wherein the controller is configured to control the image processor to control the density in the main scanning direction of an image to be formed by the image forming unit based on the conversion data.

8. The image forming apparatus according to claim 6, wherein the conversion data includes data corresponding to a plurality of areas in the main scanning direction.

9. The image forming apparatus according to claim 6, wherein the image forming unit includes a photosensitive member, a light source that exposes the photosensitive member to form an electrostatic latent image on the photosensitive member, and a developing sleeve that develops the electrostatic latent image, and
wherein the main scanning direction is a direction in which light from the light source scans the photosensitive member.

* * * * *